UNITED STATES PATENT OFFICE.

CARL FRIEDRICH SIEGERT, OF JEPPES, NEAR JOHANNESBURG, TRANSVAAL.

METHOD OF TREATING METALLIFEROUS MATERIALS.

981,696.

Specification of Letters Patent. Patented Jan. 17, 1911.

No Drawing.

Application filed July 6, 1909. Serial No. 506,162.

*To all whom it may concern:*

Be it known that I, CARL FRIEDRICH SIEGERT, a subject of the King of Great Britain, and resident of Jeppes, near Johannesburg, Transvaal, have invented certain new and useful Improvements in Methods of Treating Metalliferous Materials, of which the following is a specification.

This invention relates to a process primarily intended for the treatment of auriferous black sand, concentrates and the like, although it may be adopted for the treatment of other refractory metalliferous materials or ore for recovering the metal contents thereof.

By the use of my process or mode of treatment a very high extraction of the metal contents of the ore or material is obtained, and the process is inexpensive and simple and consequently readily carried out.

In treating auriferous ores containing copper the copper is dissolved during the treatment and a purer bullion is obtained.

The invention consists in roasting the refractory ore or heating it to a dull red heat in which condition it is brought into contact with a solution consisting of water, sodium chlorid and sal-ammoniac. The solution is then evaporated by the application of heat to the mass, and sulfuric acid is then added to the now comparatively dry mass. Water is subsequently added and the mass then mixed. The diluted acid solution is then allowed to remain in contact with the ore for a suitable length of time. The solution is thereafter drawn off and water then preferably added to the ore mass to wash out the sulfuric acid. This treatment renders the metal contents of the ore free so that they can be recovered by amalgamation in any ordinary or suitable manner.

In carrying out the invention the refractory ore is roasted or heated to a dull red heat in a furnace of any suitable construction or in any other convenient manner. In treating black sands they may be stirred or agitated either continuously or intermittently during the process of roasting or heating so as to insure uniform heating of the mass. In treating concentrates or similar refractory metalliferous materials they are preferably stirred or agitated continuously while being heated to insure uniform distribution of the heat throughout the mass. The intermittent or continuous agitation or stirring of the ore or material may be effected by any suitable means. The roasting or heating of the ore or material is carried out in such a way that the fumes can readily escape. After all the fumes have been dispelled the ore or material while still at a dull red heat is placed in or otherwise brought into contact with the solution consisting of water, sodium chlorid and sal-ammoniac, in order to free the gold from the oxids. The solution may be conveniently placed in a tank and the ore or material be raked or removed from the roaster or furnace directly into the solution in said tank. The introduction of the heated ore or material into the solution is an extremely important step in the process of treatment. Sufficient of the solution is used to cover the ore. After introducing the ore into the solution the mass is then stirred or agitated by any suitable means so as to insure intimate contact of the solution with all pieces or particles of the ore charge. After the solution has been thoroughly mixed with the ore mass heat is applied in any convenient maner to the mass to dry it by evaporating the solution. The ore mass is now treated with the sulfuric acid say by pouring the latter onto the top of the ore preferably in such a manner as to evenly distribute it over the whole surface. Water is then poured over the mass and the latter then thoroughly mixed with the diluted acid solution. After being thoroughly mixed the ore mass and solution are allowed to stand or remain in contact for say twelve hours more or less according to the nature of the ore under treatment.

After the diluted acid solution has remained in contact with the mass for a sufficient length of time. the solution is then drawn off and water is then preferably added to the ore mass to wash out the acid solution which might otherwise interfere with the recovery of the metal contents by amalgamation. When the washing out of the acid solution has been completed the ore mass may then be passed over the amalgamating plates to recover the now free metal contents thereof. To admit of this, water may be mixed with the ore mass to serve as a vehicle or medium for carrying it over the surfaces of the amalgamating plates.

The sulfuric acid can be reused by adding to it sufficient fresh sulfuric acid to bring it up to the requisite strength.

For each ton of ore to be treated I employ say forty two gallons of water to which is added ten pounds of sodium chlorid (preferably coarse pan salt) and two gallons of strong sal-ammoniac solution; the sal-ammoniac solution being prepared by dissolving two and a half to three pounds of sal-ammoniac in one hundred gallons of water.

One pound of sulfuric acid (more or less) is used in treating one ton of the ore or material, and say two gallons of water are poured on top of the ore mass after the sulfuric acid has been poured over it.

What I claim as my invention and desire to protect by Letters Patent is:—

1. The process for treating metalliferous material which consists in heating the material to a dull red heat, then bringing the heated mass into contact with a solution consisting of water, sodium chlorid and sal-ammoniac, then drying the mass by the application of heat, then adding sulfuric acid to the mass, then drawing off the acid solution and finally recovering the now free metal contents of the mass, as set forth.

2. The process for treating metalliferous material which consists in heating the material to a dull red heat, then bringing the heated mass into contact with a solution consisting of water, sodium chlorid and sal-ammoniac, then evaporating the water of the solution by the application of heat to the mass, then adding diluted sulfuric acid to the mass, then drawing off the diluted acid solution and finally recovering the now free metals of the mass, as set forth.

3. The process for treating metalliferous material which consists in heating the material to a dull red heat, then bringing the heated mass into contact with a solution consisting of water, sodum chlorid and sal-ammoniac, then evaporating the solution by the application of heat to the mass, then adding sulfuric acid to the mass, then adding water to the mass, then drawing off the diluted acid solution and then recovering the now free metal contents of the mass, as set forth.

4. The process for treating metalliferous material which consists in heating the material at a dull red heat, then inmmersing the heated mass in a solution consisting of water, sodium chlorid and sal-ammoniac, then applying heat to the mass to dry it or evaporate the solution, then adding sulfuric acid to the comparatively dry mass, then adding water to the mass, then allowing the diluted acid solution to remain in contact with the ore mass for a suitable length of time, then drawing off the diluted acid solution, then adding water to wash out the sulfuric acid and finally recovering the now free metal contents of the mass, as set forth.

5. The process for treating metalliferous material which consists in heating the material at a dull red heat in such a way that the fumes can readily escape, stirring or agitating the material either continuously or intermittently during the process of heating to insure uniform heating of the mass, then immersing the material after all the fumes have been dispelled and while it is still at a dull red heat in a solution consisting of water, sodium chlorid and sal-ammoniac, stirring or agitating the mass to insure intimate contact of the solution with the material, then applying heat to the mass to dry it or evaporate the solution, then placing sulfuric acid on the top of the comparatively dry mass in such a manner as to evenly distribute the acid over the whole surface of the mass, then pouring water over the mass, then mixing the mass with the diluted acid solution, then allowing the mass and diluted sulfuric acid solution to remain in contact for a sufficient length of time, then drawing off the diluted acid solution, then adding water to the mass to wash out the acid solution, and then passing the ore mass over amalgamating plates to recover the now free metal contents of said mass, as set forth.

In testimony whereof I have signed my name to this specification in the presence of two subscribing witnesses.

CARL FRIEDRICH SIEGERT.

Witnesses:
   CHARLES OVENDALE,
   FREDERICK ARTHUR OVENDALE.